United States Patent [19]

Plumier

[11] Patent Number: 4,713,212

[45] Date of Patent: Dec. 15, 1987

[54] PROCESS FOR SURVEILLANCE AND CONTROL OF OPERATIONS OF LOADING AND UNLOADING OF THE FUEL OF A NUCLEAR REACTOR AND APPARATUS APPLYING THIS PROCESS

[75] Inventor: Michel Plumier, Ham-Sur-Heure, Belgium

[73] Assignee: Ateliers de Constructions Electriques de Charleroi, Brussels, Belgium

[21] Appl. No.: 647,444

[22] Filed: Sep. 5, 1984

[30] Foreign Application Priority Data

Sep. 6, 1983 [EP]  European Pat. Off. ........ 83201278.5

[51] Int. Cl.⁴ ............................................. G21C 19/02
[52] U.S. Cl. ..................................... 376/258; 376/245; 376/259; 376/264; 376/267; 376/268; 376/272
[58] Field of Search ............... 376/264, 267, 268, 269, 376/271, 266, 272, 258, 245, 259; 364/513, 478; 901/16

[56] References Cited

U.S. PATENT DOCUMENTS

| 4,374,801 | 2/1983 | Albin ................................... | 376/264 |
| 4,385,028 | 5/1983 | Salaman ............................. | 376/264 |
| 4,427,623 | 1/1984 | Howard et al. . | |
| 4,487,741 | 12/1984 | Vuckovich et al. ................ | 376/271 |
| 4,504,918 | 3/1985 | Axmann .............................. | 364/478 |

FOREIGN PATENT DOCUMENTS

| 3224700 | 2/1983 | Fed. Rep. of Germany . | |
| 0093286 | 8/1978 | Japan .................................. | 376/264 |
| 0105693 | 9/1978 | Japan .................................. | 376/264 |
| 0133290 | 10/1979 | Japan .................................. | 376/264 |
| 984507 | 9/1963 | United Kingdom . | |

OTHER PUBLICATIONS

"Swiss Station Will Be Semi-Automated", NEI, pp. 42-44, Fontaine et al, 7-81.
"Automated Control Rod Programming in Boiling Water Reactor Cores", Zhong et al, Nac. Tech., 6-84, pp. 383-394.
"Fuel Handling System and Fuel Description", Gee et al, NEI., pp. 878-880, 11-73.
Itoh et al, "Japan Engaged in Automatic Refueling", Nuclear Energy International, vol. 26, No. 310, pp. 23-24, Mar. 1981.
Patents Abstracts of Japan, vol. 2, No. 21, p. 7287 M 77, 2/78, (Kokai No. 52-135992, Nov. 4, 1978—Hitachi Seisakusho K.K.).
Smith et al, "Computer-Controlled Refueling Machine at Fort St. Vrain", IEEE Transactions on Nuclear Science, vol. NS-20, No. 1, Feb. 1973, IEEE, New York.
Patents Abstracts of Japan, vol. 2, No. 21, p. 7332 M 77, 2/78, (Kokai No. 52-137592, Nov. 17, 1977—Hitachi Seisakusho K.K.).

Primary Examiner—Deborah L. Kyle
Assistant Examiner—Daniel Wasil
Attorney, Agent, or Firm—Schwartz, Jeffery, Schwaab, Mack, Blumenthal & Evans

[57] ABSTRACT

Apparatus and process for supervising and controlling the operations of loading and unloading of fuel of a nuclear reactor comprising an information processor 30 formed from several units. A treatment unit 31 receives control signals giving notably the position, the speed, the load of machines 7 and 16 operating the loadings and unloadings of groups in the core 2, the reactor pool 3, and the spent fuel pit 14. A programmable unit 34 furnishes command signals, previously recorded, representing the loading sequence. The command and control signals are treated in a central calculating unit 35 which, while considering the information furnished by the permanent memory unit 32 and by the temporary memory unit 33 gives on one hand the coordinates of all sites for the groups, and on the other hand the coordinates of the places of the movable elements as well as the identification marks and positions of each group, compares the different signals received, and according to their coincidence, authorizes or arrests the directed movement. The temporary memory unit 33 saves the last position acquired while erasing the previously occupied positions, while the control box 37 records all of the movements executed.

8 Claims, 5 Drawing Figures

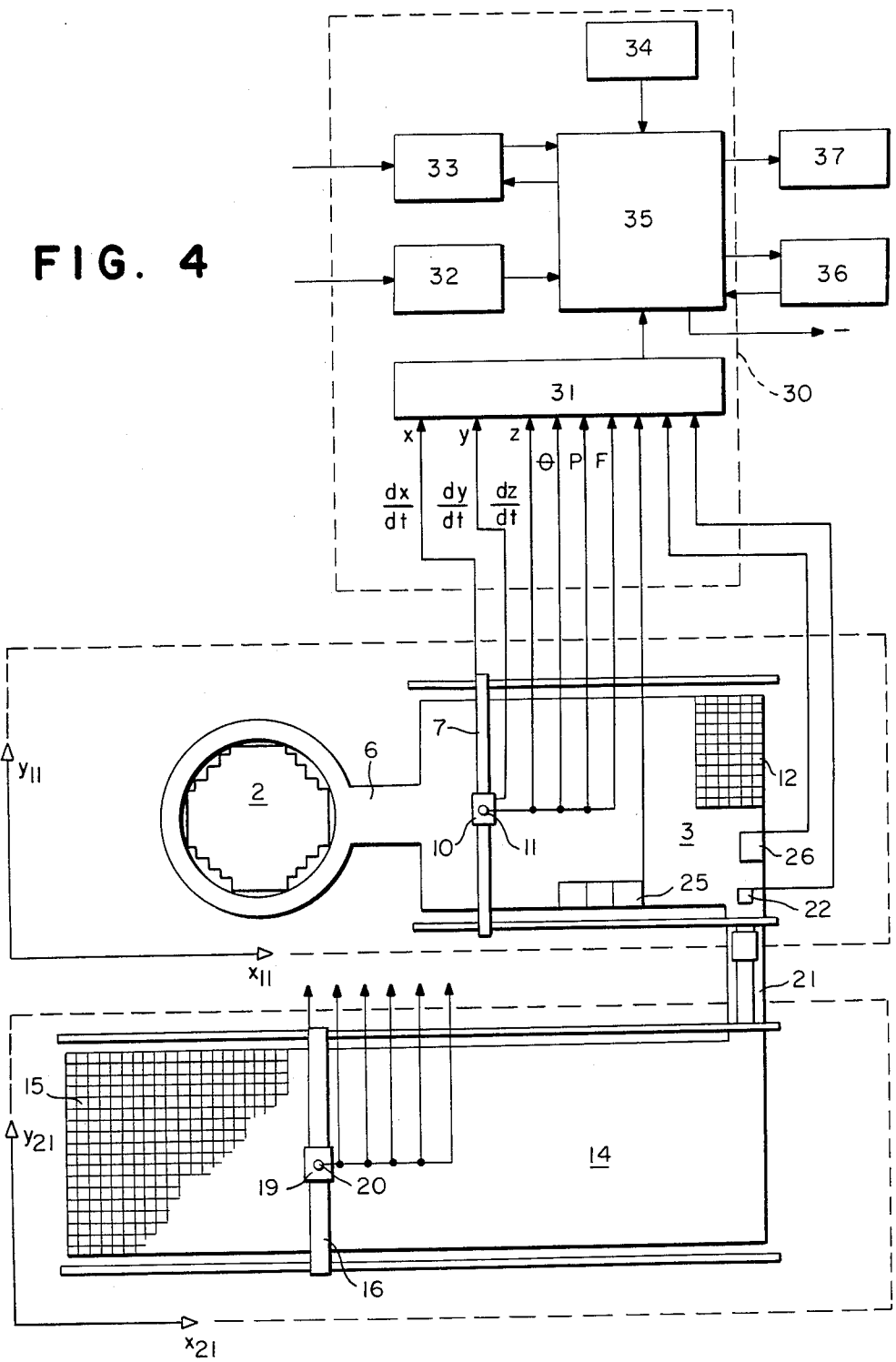

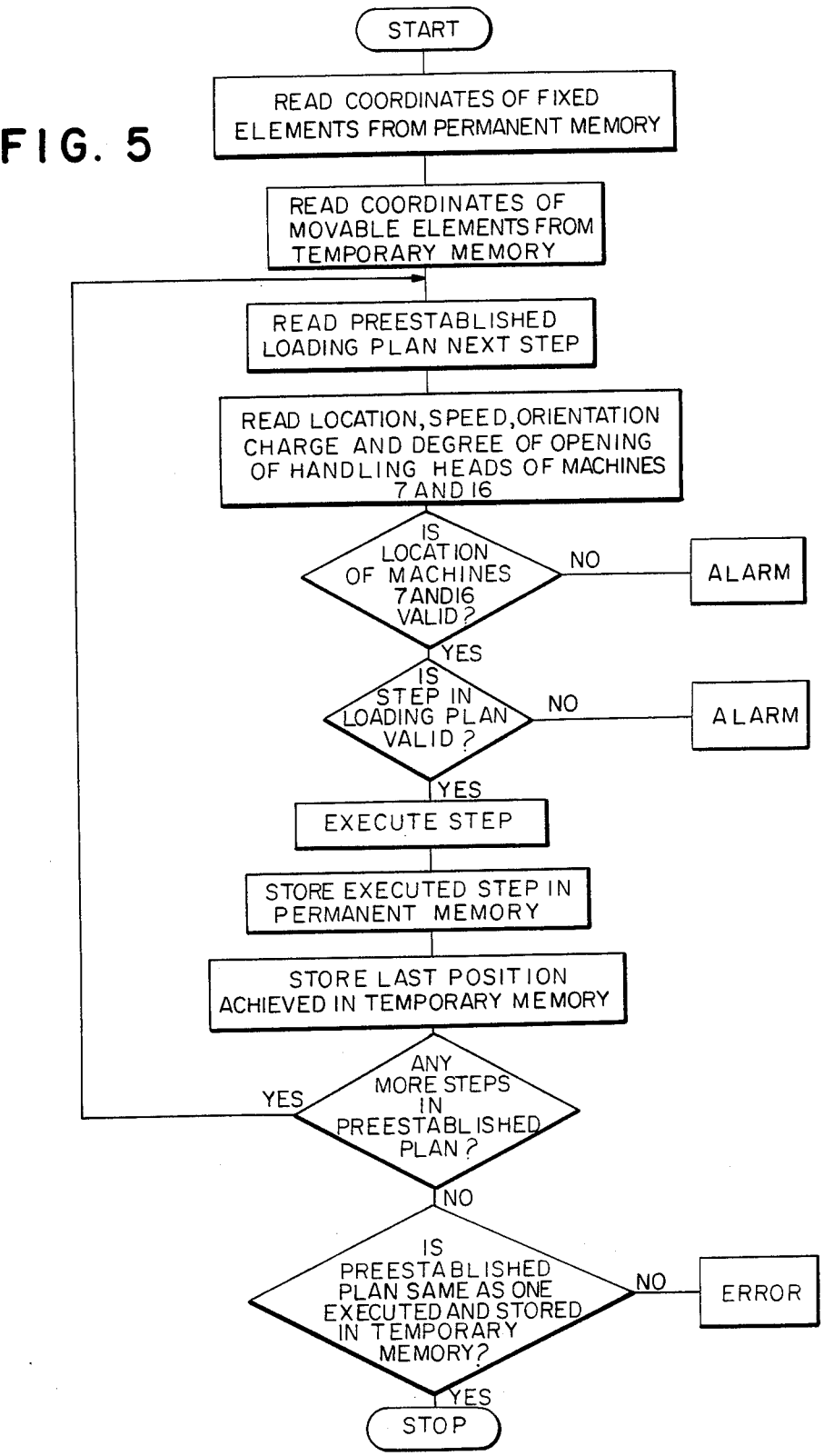

PROCESS FOR SURVEILLANCE AND CONTROL OF OPERATIONS OF LOADING AND UNLOADING OF THE FUEL OF A NUCLEAR REACTOR AND APPARATUS APPLYING THIS PROCESS

This invention relates to a process and apparatus for the surveillance and control of the various operations involved in the loading and unloading of the fuel in a nuclear reactor.

BACKGROUND OF THE INVENTION

A core of a nuclear reactor is comprised of groups of a square or hexagonal cross section, each comprising a bundle of rods comprising the fissionable material. These groups are arranged side-by-side in the core of the reactor according to a network of square or triangular channels.

In order to bring about the best possible utilization of the nuclear fuel material and in order to avoid points of excessive flux, the arrangement of the groups is the object of predetermination by calculation, generally termed the loading plan of the core of the reactor.

During the first loading of the core of the reactor, the fresh groups, not yet irradiated, are distributed in regions according to the different ratios of enrichment in fissionable material which are specified in such a manner as to bring about a power distribution which is as uniform as possible.

After a cycle of irradiation, generally on the order of one year, each group has furnished a variable quantity of energy according to the initial ratio of enrichment of the fissionable material and according to the position occupied in the core of the reactor. It is necessary, therefore, to proceed with replacement of a certain number of groups which no longer possess but a weak potential for liberation of energy by an equal number of fresh groups. Furthermore, in order to make uniform the power distribution, new coordinates are assigned to each group, and different orientation in the core of the reactor is assigned as well. This new arrangement becomes the object of a new loading plan established by calculations, and determining for each group a new set of coordinates.

In order to bring about the disposition of the groups in conformance with the new loading plan, it is necessary to proceed according to a series of manipulations for removing the spent groups, replacing the fresh groups, and exchanging the rest of the groups in the core of the reactor.

Often, the reorganization of the groups in the core must be accompanied by an exchange of other components of the core, such as control rods, ion sources, clusters of plugs, of contaminants, etc.

All of these operations lead to a final state for which the core of the reactor contains a mixture of irradiated groups and fresh groups corresponding to a new loading plan with, for each group of the core, position specified by new coordinates. The modifications interposed in the core of the reactor then react together in the reactor pool where there is located a buffer rack, and in the deactivation pool (also known as a spent fuel pit) where is situated the stockpile or storage racks.

This set of manipulations must be carried out according to a rigorous procedure, termed a loading sequence.

The loading sequence comprises a series of instructions to be carried out in rigorous order, one after the other. According to the type and size of the reactor, a loading sequence comprises a number of variable instructions, sometimes greater than 500. These instructions are given to operators of the group manipulation machines. Each instruction carries an order number, the identification of each group or component involved in the manipulation, the localization of departure and the localization of destination. The loading sequence scrupulously prepared in advance and correctly executed, leads to an actual loading plan which will be identical to the specified loading plan.

It is important that the actual loading plan be verified in order to be forewarned against any loading error which could cause unacceptable hot spots and a poor utilization of nuclear fuel.

Actually, the verification is twofold. In the first phase of verification, coming about at the end of the loading sequence, each group which is immersed into the core of the reactor is verified by optical means in order to assure perfect correlation between the actual loading plan and the calculated loading plan. It is necessary notably to be assurer that the identification number engraved on the head of the group corresponds to that which is specified for the particular position in the specified loading plan. According to the subjective nature of this first verification, and the inherent difficulties in reading the identification numbers due to the state of fouling of the groups or due to lack of water clarity, a second verification phase is provided after replacement in the location in the reactor. When the interior of the reactor is re-closed, the connections are re-established and the reactor, returned to nominal conditions of pressure and temperature, has exceeded the critical state, there is effected a neutron flux distribution field in the core for comparison with calculated values, and then validation of the state of the core of the reactor before increasing the pressure. If this second phase of verification reveals an error, it is necessary to recommence entirely the loading and agree to a supplementary arrest for several days.

DESCRIPTION OF THE INVENTION

The claimed invention eliminates the aforementioned disadvantages. It comprises a process which, upon beginning from an initial validated state, permits knowing the final state of the reactor core in an unequivocal manner due to a control and a registration of each operation effectively executed according to a loading sequence, often complex, taking account of all movements in the reactor core, in the reactor pool, across the transfer tunnel, and in the deactivation pool.

This process satisfies the necessity of having at the end of the loading sequence a rigorous correlation between the actual loading plan and the calculated loading plan insofar as concerns the identity of the groups and the components and the coordinates of their localization within the core of the reactor, and in the stockpile racks of the deactivation pool.

The process presents the advantage of acting as an element of independent control for the operations generally carried out manually by several operators who may, under certain conditions, not understand them. This process accounts for the x, y and z coordinates of the gripping heads of the loading machines, their angular position, the opening of the tongs, the speed of displacement of the machines, fixed or movable obstacles, irradiated elements to be removed or replaced in the core of the reactor, fresh elements to be introduced into the core, and all of the manipulations which follow in the pool of the reactor, in the stockpile pool, and in the transfer tube situated between the deactivation pool and the reactor pool.

In a first application, the process departs from an initial, validated state to a final state of the core of the reactor with cancellation of all intermediate operations. A second application preserves, on the contrary, all of the intermediate operations for permitting a subsequent control in case of need.

Finally, the process presents the advantage of carrying out a blank test, that is, carrying out a simulation of the preestablished loading sequence, and verifying the preestablished loading sequence leads effectively to the new specified loading plan.

In a more sophisticated version, one can bring under control the motorization of the loading machines in the preestablished sequence and thus obtain a complete automation of these manipulations.

The apparatus for applying this process comprises alarms which, for fixed obstacles, work in redundancy on the equipment likely to encounter trouble, and for temporary obstacles, are easy to be introduced by a new point of record of the alarm corresponding to the sides of the temporary obstacle.

Each machine utilized for manipulation of the groups is provided with codes of position and of rotation of the mast, and in addition it carries means for detecting the presence of a load.

All the signals generated are sent to an information processor which manages all the signals. This processor can know the position of extraction and insertion of all the elements. Due to the registration of each movement, by the informational means and for each of the pools considered, one can at any moment:

edit a position map which at the end of a sequence will constitute the new loading plan of the core of the reactor and of the storage racks;

know the free positions and the positions already occupied for avoiding any manipulation accidents;

maintain for the future a trace of all of the operations;

anticipate each step of the sequence and verify if it is possible to be executed;

effectuate first of all a blank test of the entire sequence in order to verify that it will lead to the calculated loading plan;

avoid all collision of a manipulated load with a fixed or movable obstacle.

DESCRIPTION OF THE DRAWINGS

The invention is described in greater detail with reference to the following figures.

FIG. 4 is a schematic representation of the principles of the apparatus;

FIG. 5 is a summary of the process of the present invention in flowchart form.

DESCRIPTION OF THE PREFERRED EMBODIMENTS

Figure 1:
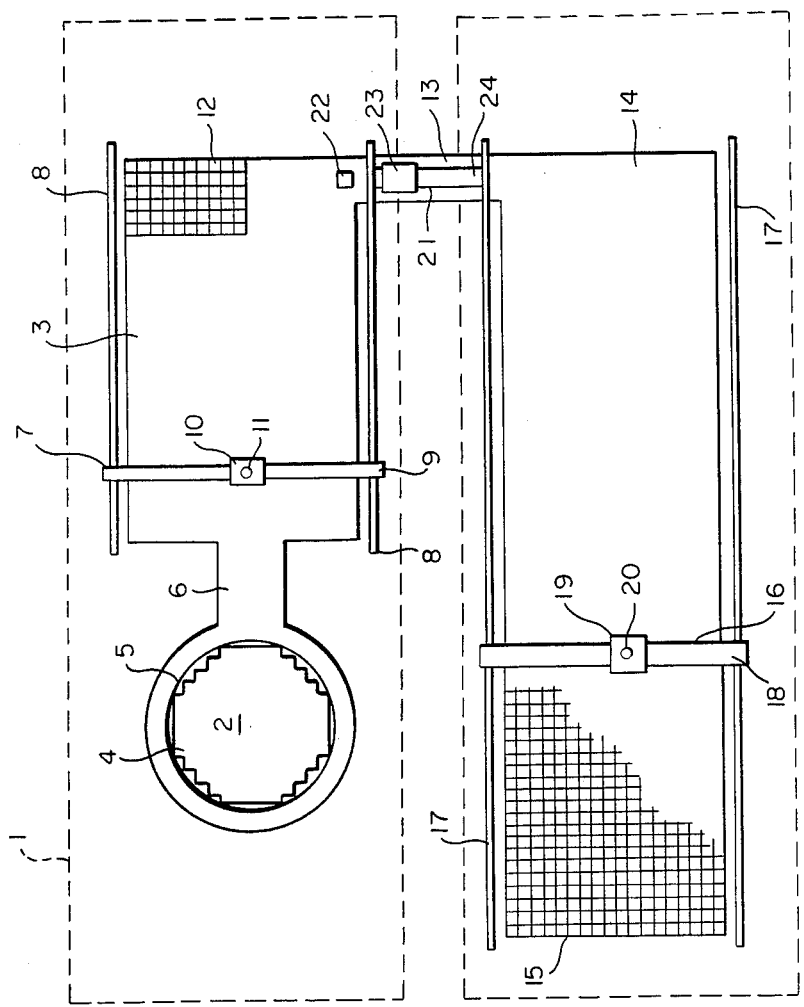
FIG. 1 is an assembly schematic of a reactor.

FIG. 1 represents a schematic of a nuclear installation. An enclosure 1 protects a reactor 2 and a reactor pool 3. The reactor 2 comprises a core 4 situated at the interior of a vat 5. A loading canal 6 connects the reactor 2 to the reactor pool 3. The reactor pool 3 and the reactor 2 are supplied by a reactor pool loading machine 7 movable on rails 8. The loading machine 7 comprises a bridge 9 upon which is displaced a carriage 10. The carriage 10 comprises a telescopic mast 11 provided with sensors on the extremity serving to hook onto the core assemblies 4 of the reactor 2. In the reactor pool 3 is found a stockpile or storage rack 12 which is used to temporarily position the groups to be exchanged in the core of the reactor.

A transfer tube 13 assures the connection between the reactor pool 3 and the deactivation pool 14 in which is found a storage rack 15.

The deactivation pool 14 is served by a deactivation pool handling machine 16 which is movable on the rail 17. In the example represented in FIG. 1, the handling machine 16 comprises a bridge 18 upon which is moved a carriage 19. The carriage 19 also includes a telescopic mast 20 provided with sensors at the end for manipulating the groups.

The transfer tube 13 is served by a transfer machine 21 comprising a transfer basket 22 and an apparatus which swings horizontally for placing the load on a carriage 23 for movement along the rails 24. The function of this transfer machine 21 is to proceed with a transport of the individual group between the reactor pool 13 and the deactivation pool 14.

Figure 2:
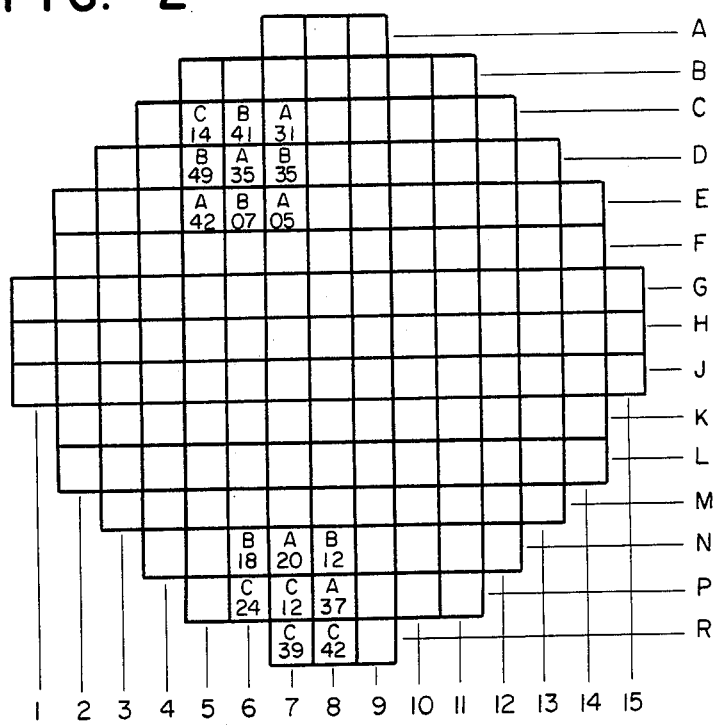
FIG. 2 is an example of a loading plan for fresh groups.
Figure 3:
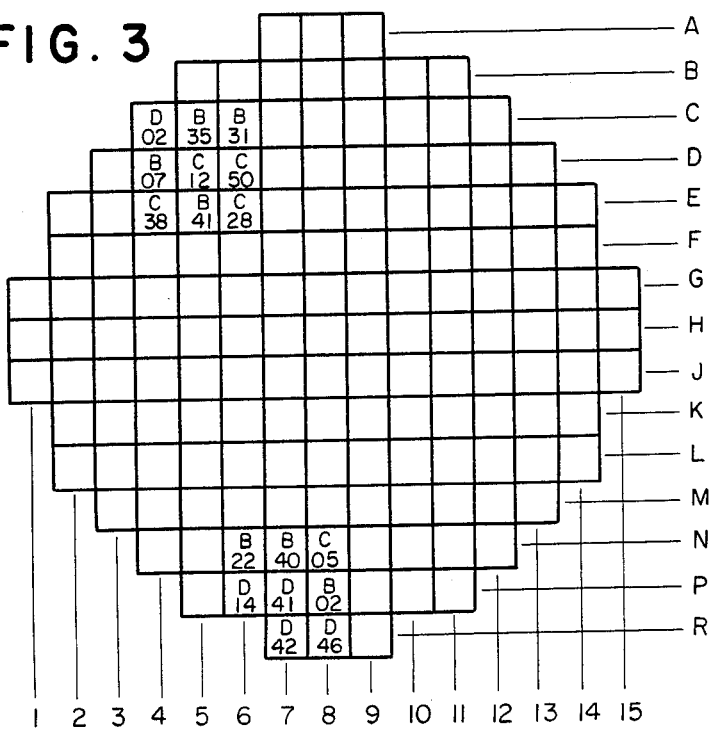
FIG. 3 is an example of a loading plan for fresh and irradiated groups.

FIGS. 1 and 2 allow us to schematically follow a first example of manipulations. Assume that in the course of a charging sequence for a group A35, having coordinates 6D situated in the core 4 of the reactor, is to be transferred to the deactivation pool 14 for being replaced by another group C12 of coordinates 7P. The site of the coordinates 7P being itself occupied afterwards by a fresh group D41.

For carrying out these manipulations, the unloading machine 7 first of all extracts the group A35 for placing it in the basket 22 of the transfer machine 21. After dumping the basket 22 the carriage 23 transfers the basket charged with the assembly A35 from the reactor pool 3 to the spent fuel pit 14. The handling machine 16 takes the group A35 out of the transfer basket 22 for placing it into a free space in the storage rack 15, for example in NL22.

The loading machine 7 then extracts the group C12 from its location, at coordinates 7P, and places it at the location which has become free at coordinates 6D.

Thereafter, the handling machine 16 takes the fresh group D41 from the storage rack 15 and places it in the transfer basket 22. Next, the transfer machine 21 brings the group D41 into the reactor pool 3. The loading machine 7 extracts then the group D41 from the transfer basket 22 and places it in the core 4 at the site of coordinates 7P. Upon the manipulation of the sets may be superposed a manipulation of components such as control rods or sets of plugs effectuated with the aid of a movable deposit station situated in the reactor pool 3.

In the control process generally utilized in nuclear power plants, each manipulation constitutes one step in a loading sequence recorded in a loading listing which starts up, one by one, a sequence of pre-established administrative orders upon which an officer notes the beginning and ending times of the manipulation and validates the operation by his signature. This control only bears upon recorded administrative orders in the loading listing. Good execution of the manipulations rests upon the scrupulous execution of the administrative orders. At this level, therefore, can creep in manipulation errors owing either to a poorly worded administrative order, or an order poorly executed by the operator, or a faulty execution by the machine in spite of a well executed command by the operator.

All of these errors are radically eliminated in the process according to the claimed invention.

As represented in FIG. 4, assuming the reactor enclosure has a system of axes $x_{1i}$, $y_{1i}$ permitting the placement with precision of the groups in the reactor 2, in the buffer rack 12, in the transfer basket 22 and in all other auxiliary apparatus equipping the reactor pool 3, such as a movable settling station 25 used for making exchanges of components in the midst of certain groups, or a fixed settling station 26 used for eliquation tests for detecting unexpected damage in a group on the rods forming the group.

Assuming that the spent fuel pit 14 has another system of axes $x_{2i}$, $y_{2i}$, permitting placement with precision of the groups in the storage rack 15 and in the transfer basket 22, when the latter is located effectively in the spent fuel pit 14. The coordinates $x_{1i}$, $y_{1i}$ and $x_{2i}$, $y_{2i}$, which permit establishment of localization in the plan, are completed by the coordinates z which are situated on the depth of the groups, the handling heads of the loading machine 7 and the handling machine 16 and a camera perch, not shown, utilized for identifying the groups. These position coordinates x, y, z are provided by the codes given to the absolute position, independently of any interruption of current occurring at the installation. The codes are for example optical codes carried along without slippage by an appropriate mechanical apparatus. We have thus in $x_{1i}$, $y_{1i}$, $z_{1i}$, the coordinates of placement of the groups in the core 2, the buffer rack 12, and the fixed resting station 26 which are the fixed coordinates, whereas the coordinates of the mobile resting station 25, the transfer basket 22, and the dams positioned, for example, in the recharging canal 6 are the variable parameters.

In the same way as $x_{2i}$, $y_{2i}$, $z_{2i}$, the coordinates of the storage rack 15 are fixed while the coordinates of the transfer basket 22 are variable parameters.

We can designate by $x_1$, $y_1$, $z_1$, the position of the gripping head of the loading machine 7, and by $x_2$, $y_2$, $z_2$ the position of the gripping head of the handling machine 16.

The signals corresponding to the coordinates x, y, z are sent to an information processor 30 charged with their management. Moreover, the information processor 30 receives information on the speed of displacement dx/dt, dy/dt, dz/dt, and the orientation $\theta$ of the gripping heads of the loading machine 7 and the handling machine 16, on the charge P and degree of opening F of the tongs of these machines. Also communicated to the information processor 30 are the identification marks of the groups, the loading plans, and the loading sequence.

All of this information is not treated in the same manner. For that, it is necessary to distinguish in the information processor 30 a unit of treatment 31 charged with recognizing and treating the signals $x_1$, $y_1$, $z_1$, $dx/dt_1$, $dy/dt_1$, $dz/dt_1$, $\theta_1$, $P_1$, $F_1$ characterizing the handling head of the loading machine 7 and the signals $x_{2i}$, $y_{2i}$, $z_{2i}$, $dx/dt_2$, $dy/dt_2$, $dz/dt_2$ $\theta_2$, $P_2$, $F_2$ characterizing the gripping head of the handling machine 16.

The fixed coordinates $x_{1i}$, $y_{1i}$, $z_{1i}$ of the locations for these groups in the core 2, the buffer rack 12, and the fixed resting station 26 of the reactor pool 3 are permanently registered in a permanent memory unit 32. The permanent memory unit 32 also receives fixed coordinates $x_{2i}$, $y_{2i}$, $z_{2i}$ of the storage rack 15 of the spent fuel pit 14.

By contrast, the coordinates of the movable resting station 25, the transfer basket 22, the dams of the reactor pool 3, as well as the identification marks of the groups and their position occupied in the core 2 and in the storage racks 15 are registered in a temporary manner in a temporary memory unit 33.

At the time of the first loading, there takes place for the first initiation the recordation of the coordinates of all of the sites provided for these groups, as well as the initial position and the identification of each group and the introduction of these values into the memory units 32 and 33.

As for the loading sequence, there is furnished a programmable unit 34.

The signals treated in the different units 31, 32, 33 and 34, which constitute the information processor 30, are then transmitted to a central calculating unit 35 which is connected with a conversational system 36.

Upon unfolding of the loading sequence, each executed step is registered in a control box 37 which serves as a reference as well as a specialized organism charged with the surveillance of the fuel in the power plant, as well as for the personnel of the power plant for proceeding with verifications or controls of manipulation.

At each instant the central calculating unit 35 compares the values furnished by the permanent memory unit 32, by the temporary memory unit 33, and by the programmable unit 34 with the values issuing from the treatment unit 31 for determining the ways of displacement of the handling heads of the machines 7 and 16 while taking into consideration permanent and temporary obstacles.

In addition, while comparing the values furnished by the temporary memory unit 33 and by the permanent memory unit 32 to those values furnished by the programmable unit 34, the central calculating unit 35 may, according to the result of the comparison, authorize or refuse the step of the sequence engaged, and place into memory all valid calculations at the time in the temporary memory unit 33, and in the conversational system 36, for taking into consideration the evolution of the loading sequence. The central calculating unit 35 establishes at each instant a comparison between the researched position and the actual position of the manipulated group. If for example, the central calculating unit 35 verifies that the handling machine 16 is at the point of lowering a group into an erroneous site, the central calculating unit 35 sends a negative signal which annuls the requested order. That is translated by an alarm and eventually by a blockage of the lowering movement in such a manner as to avoid serious consequences resulting, for example, from the resting of a second group on a first already in place swinging the second group and risking destruction of the groups.

This new process offers the advantage of recording the actual movements of the loading machine 7 and of the handling machine 16. It stores the actual successive positions occupied by the groups in their pools and the reactor, and not the desired positions in a sequence of administrative orders.

In other words, the preestablished sequence furnishes to the programmable unit 34 and transmitted to the central calculating unit 35 permits making a blank test, that is, a simulation of the preestablished loading sequence, in order to verify if it will effectively lead to the specified charging plan. This characteristic clearly represents a significant advantage for operators of nuclear power plants.

The orders admitted by the central calculating unit 35 are memorized in two different manners. A first memory called a control box 37 faithfully registers all of the movements executed in order to permit, in the event it is needed, the making of a detailed analysis of the different operations.

A second memory installed in the temporary memory unit 33 is conceived for remembering the last position achieved by each group while erasing the previously occupied positions. In this manner, at the end of a loading sequence, it gives the new loading plan effectively achieved while reproducing exactly the placement and identification of each group in the core and in the storage rack 15. Obtained on the basis of control of operations which have been effectively executed, the new loading plan gives a total guarantee of the exactitude of the configuration. A summary of this aforementioned process in flowchart form is shown in FIG. 5.

In the conversational system 36, there is at one's disposal video screens and keyboards for the introduction of given information in order to permit:

dialogue between operating personnel and the information processor 30;

visualization of orders for execution of movement; evolution, at any moment, of the loading plan giving the place and the identification of all of the groups, in order to know in the example being negotiated, in the core 2, in the buffer rack 12, in the mobile resting station 25, in the basket 22, in the fixed resting station 26, in the stockpile rack 15;

the visualization of the schematic of each pool giving the position of obstacles, of handling heads, and even the way of displacing the gripping heads; the introduction in the loading sequence, furnished previously to the programmable unit 34, of a modification of the sequence in order to respond to a new need.

In a more advanced system, one can achieve an entirely automatic loading operation. It is sufficient to bring under control the motorizing of machines in the preestablished sequence. The automatic operation can involve the choice and the execution of the most appropriate routes for movement of the gripping heads of the machines 7 and 16.

I claim:

1. A process for the fully automated supervision and control of loading and unloading operations of groups of combustible nuclear elements into a core of a reactor, a reactor pool and a spent fuel pit by means of a reactor pool loading machine having a telescopic mast, upon the end of which is provided a gripping head with pinchers, for supplying the reactor and the reactor pool having a buffer rack, a fixed deposit station a transfer basket and a plurality of mobile deposit stations, and a deactivation pool handling machine having a telescopic mast, upon the extremity of which is provided a gripping head with pinchers for supplying the spent fuel storage pit containing storage racks and a transfer apparatus assuring the connection between the reactor pool and the spent fuel pit, comprising the steps of:

(a) recording a position of each group in the core of the reactor, the storage rack and the buffer rack, (b) recording a position of the reactor pool loading machine, the deactivation pool handling machine, the transfer apparatus and the mobile deposit stations, (c) verifying the identification of each group at the moment of gripping and/or at the moment of release of each group in the core of the reactor, in the buffer rack, in the transfer basket, in the storage rack, in the fixed deposit stations, and in the mobile deposit stations, (d) supplying command and control signals for the manipulation of the reactor pool loading machine, the deactivation pool handling machine, the transfer apparatus and the mobile deposit stations;

(e) comparing the command signals and control signals of each manipulation ordered to the reactor pool loading machine, to the deactivation pool handling machine, to the transfer apparatus, and to each mobile deposit station with recorded signals of a pre-established loading sequence and the position of each group, for producing a signal in one of:
(1) a first state indicating coincidence in said comparing step whereby said ordered manipulation can be safely carried out, and
(2) a second state indicating noncoincidence in said comparing step whereby said ordered manipulation cannot be safely carried out, (f) carrying out one of (1) the manipulation of the reactor pool loading machine, the deactivation pool handling machine, the transfer apparatus and the mobile deposit station in response to said signal in said first state, and (2) a blocking of subsequent ordered manipulation by the reactor pool loading machine, by the deactivation pool handling machine, by the transfer apparatus or by any of the mobile deposit stations, (g) updating the position of the group moved by the ordered manipulation; and (h) establishing a table of final positions of each group in the core of the reactor, in the storage racks, and in the buffer rack for establishing a plan of disposition of the groups.

2. A process according to claim 1 further including the step of storing the command and the control signals of each manipulation carried out by the reactor pool loading machine, the deactivation pool handling machine, the transfer apparatus, and by each mobile deposit station for obtaining a trace of the manipulations carried out.

3. A process according to claim 1 including causing the actuation of motors powering the reactor pool loading machine, the deactivation pool handling machine, and the transfer apparatus according to the pre-established loading sequence.

4. An apparatus for fully automated supervision and control of loading and unloading operations of groups of combustible nuclear elements into a core of a reactor, a reactor pool and a spent fuel pit comprising:

(a) a reactor pool loading machine having a telescopic mast upon the end of which is provided a gripping head with pinchers for supplying the reactor and the reactor pool having a buffer storage rack, a fixed deposit station and a mobile deposit station, (b) a deactivation pool handling machine having a telescopic mast, upon the end of which is provided a gripping head with pinchers for supplying the spent fuel storage pit containing storage racks and a transfer apparatus interconnecting the reactor pool and the spent fuel pit, (c) at least one memory unit for storing current coordinates and identification marks of each group and coordinates of permanent and temporary obstacles in the core, the reactor pool and the spent fuel pit, (d) a central calculating unit for determining the absolute position, orientation and speed of displacement of the gripping head mounted at the end of the reactor pool loading machine and the gripping head mounted at the end of the deactivation pool handling machine wherein the degree of opening of the pinchers mounted on the gripping head and the load taken by the reactor pool loading machine and the deactivation pool handling machine are converted to signals, (e) a treatment unit for receiving said signals wherein current coordinates of the groups, coordinates of the manipulations of the groups and coordinates of permanent obstacles in the core, the reactor pool and the spent fuel pit are stored in the at least one memory unit and transmitted to the central calculating unit, and (f) a programmable unit for transmitting a pre-established loading sequence to the central calculating unit wherein signals from the treatment unit are transmitted to the central calculating unit for comparison with the pre-established loading sequence and the current coordinates of the groups, and according to the result of this comparison, either recorded in the at least one memory unit indicating coincidence or provides a reactive signal indicating a lack of coincidence.

5. A supervision and control apparatus according to claim 4 wherein the pre-established loading sequence furnished by the programmable unit and the signals from the treatment unit are recorded in at least one additional memory unit after transmission to the central calculating unit.

6. A supervision and control apparatus according to claim 4 wherein the reactive signal emitted by the central calculating unit comprises an alarm signal that blocks further manipulation of the reactor pool loading machine upon approaching an obstacle.

7. A supervision and control apparatus according to claim 4 wherein the central calculating unit enables the energizing of motor means for the reactor pool loading machine, the deactivation pool handling machine, the transfer apparatus, and the mobile deposit station, when there is coincidence between the pre-established loading sequence furnished by the programmable unit and the signals received by the treatment unit.

8. A supervision and control appparatus according to claim 4 including a conversational system for introducing the pre-established loading sequence into the programmable unit and for modifying the pre-established loading sequence.

* * * * *